March 30, 1965    F. S. SCHILER    3,175,820
ROTARY TABLE HAVING TRIMETRIC ADJUSTMENT FEATURES
Filed Nov. 9, 1962    2 Sheets-Sheet 1

INVENTOR.
FREDERICK S. SCHILER
BY
ATTORNEY

March 30, 1965  F. S. SCHILER  3,175,820
ROTARY TABLE HAVING TRIMETRIC ADJUSTMENT FEATURES
Filed Nov. 9, 1962  2 Sheets-Sheet 2

INVENTOR.
FREDERICK S. SCHILER
BY
ATTORNEY

United States Patent Office 3,175,820
Patented Mar. 30, 1965

3,175,820
ROTARY TABLE HAVING TRIMETRIC
ADJUSTMENT FEATURES
Frederick S. Schiler, Cuyahoga Falls, Ohio, assignor to Portage Machine Company, Akron, Ohio, a corporation of Ohio
Filed Nov. 9, 1962, Ser. No. 236,564
7 Claims. (Cl. 269—296)

This invention relates to the art of rotary tables used for rotatably supporting work pieces for various inspection and/or machining operations and in particular has reference to an improved type of attachment used for such rotary tables to permit the same to have trimetric adjustment features.

In the art of rotary tables, it has long been known that a rough casting or work piece can be supported on a rotary table for locating angularly disposed points thereon, with it being conventional to appropriately position the work piece so the axis of rotation of its opening, for example, is coincident with the axis of rotation of the rotary table.

Tables of this type have long been known in the art and no novelty per se is claimed with reference to the particular type of rotary table assembly that is disclosed herein.

It has been known, however, that such rotary tables, while functioning as above described, do require an inordinate amount of time to properly position the work with respect to the same, because of the fact that the operator must, of necessity, have perfect alignment between (1) the respective axes of rotation and (2) the table and a starting plane on the work piece. In this regard, concentricity between the respective axes of rotation is required for the obvious expedient of accurately measuring angular variations upon rotation of the table, while alignment between the table and an appropriate reference plane is required to establish a starting point for subsequent operations that will be performed.

At the present time both adjustments aforementioned require time consuming cut and try methods that oftentimes result in inaccuracies.

It has been discovered that the aforementioned disadvantages can be obviated by providing a supplemental support plate that is received on top of the normal rotary component of a rotary table, with this auxiliary, or supplemental plate, normally being provided with a central aperture that encircles the axis of rotation of the rotary table. In this fashion, and by disposing a hub in concentricity with the axis of rotation of the rotary component, lateral shifting of the supplementary table can be achieved to shift the work laterally of the rotary component and thus avoid the necessity of resetting the work piece with respect to the surface upon which the same is being supported.

It is further intended in this regard to employ the usual supporting jacks that are adjustable vertically from the supplemental plate and which project from the surface of the supplemental table thereof to support the work piece in elevated condition. Thus, it will be seen that two dimensional horizontal movements can be achieved with respect to the axis of rotation of the rotary table by the use of the supplemental plate while a third dimension of vertical movement can be achieved through the medium of the adjustable jack supports.

Accordingly, trimetric adjustability is provided to the rotary table assembly by use of the improved supplemental plate on the rotary table assembly as will hereinafter be described in greater detail.

Before proceeding with a detailed description of the improved trimetric adjustment device, it is believed manifest to note that the inventive concepts herein can be used with any one of several standard types of rotary tables that are presently known and that the rotary table assembly that is shown in the drawings and described in the specification is merely used for illustration purposes.

Accordingly, production of such an improved trimetric adjustment device for rotary tables is the principal object of this invention with other objects thereof becoming more apparent upon a reading of the following brief specification, considered and interpreted in the light of the accompanying drawings.

Figures 1, 2:
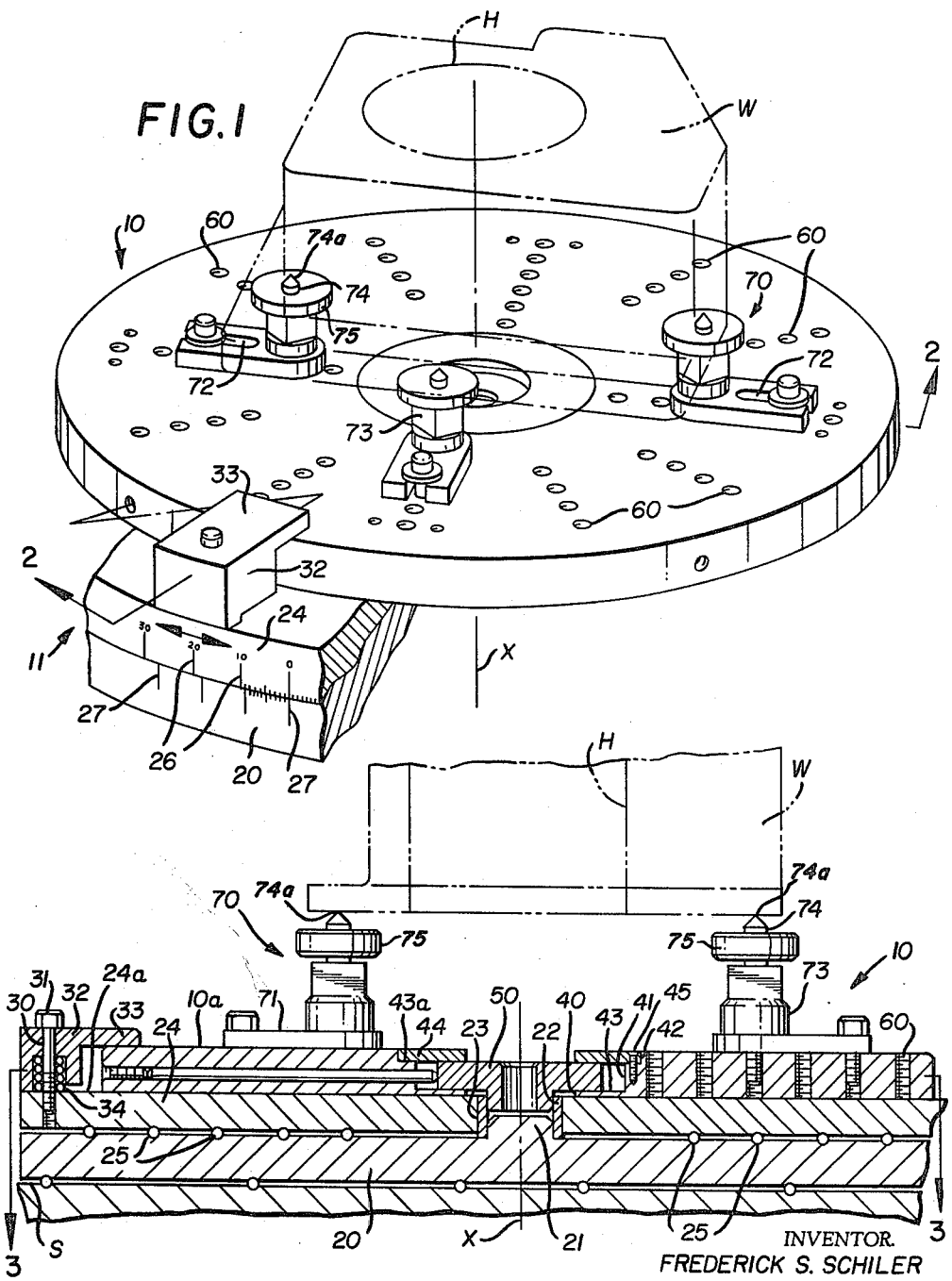
FIGURE 1 is a perspective view of the improved trimetric adjustment device shown secured to a rotary table, with a work piece shown in phantom lines being supported thereon.
FIGURE 2 is a vertical section taken on the lines 2—2 of FIGURE 1.

Referring now to the drawings and in particular to FIGURE 1, the trimetric adjustment unit, generally designated by the numeral 10, is shown adjustably supported on top of a rotary table assembly 11 so as to permit three dimensional adjustment of a work piece W with respect to the axis of rotation X, X of the rotary table assembly 11.

Considering first the detailed structure of the rotary table assembly 11, it will be first noted from FIGURE 2 that the same includes a fixed component plate 20 that is received on a supporting surface S and that normally remains fixed during operation of the rotary table assembly 11. The plate 20 has an appropriate central hub 21 that is journaled within the bushing 22 which is provided in the opening 23 of the moveable rotary component plate 24, with a plurality of bearings 25, 25 being interposed between the adjacent faces of plates 20 and 24 so as to permit free rotational movement of the plate 24 around the axis of the hub member 21. The moveable rotary component 24 has scale indicia 26, 26 provided on the peripheral edge thereof as shown best in FIGURE 1, while fixed rotary component plate 20 has a vernier 27 provided on its periphery for the purpose of measuring rotational movement of plate 24 with respect to the fixed component plate 20.

In addition to the aforementioned component parts, the top surface 24a of the moveable component plate 24 is provided with a tapped opening 30 within which a bolt 31 may be threaded, with the bolt 31 passing through an appropriate opening in a clamping block 32 so as to provide releasable clamping means that will clamp the trimetric adjustment plate 10 with respect to the moveable unit plate 24 as will now be described.

In this regard and referring to FIGURES 1 and 2, it will be seen that the clamp 32 includes a lip edge 33 that overhangs the top surface 10a of the trimetric adjustment plate 10 with the plates 24 and 10 being shown clamped together for rotation in unison in FIGURE 2 of the drawings. A spring 34 is positioned in an appropriate recess for encirclement of the central portion of bolt 31 so as to urge the lip 33 out of contact with the surface 10a when the bolt 31 is backed off, with the spring 34 lifting the clamp 32 out of contact as is obvious.

Figure 3:
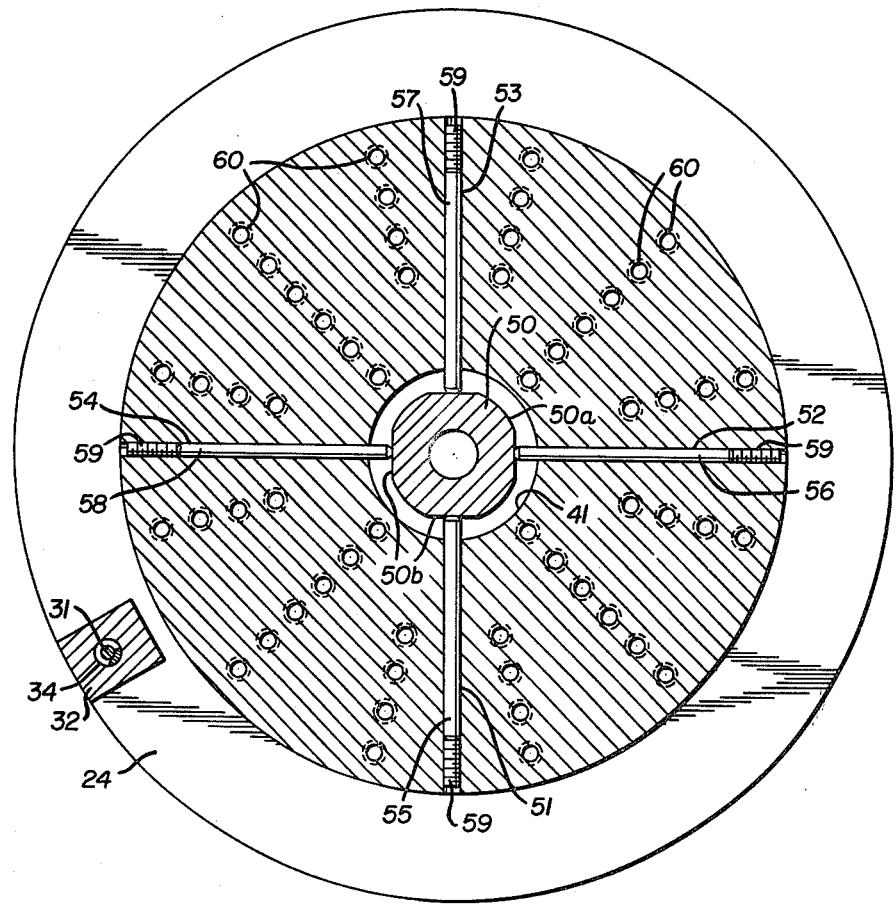
FIGURE 3 is a horizontal plan view taken on the lines 3—3 of FIGURE 2.

Turning now to FIGURES 2 and 3 for a detailed consideration of the trimetric adjustment plate 10, it will be noted that the same is of conforming circular configuration and includes a central bore 40 that is counterbored, as at 41 and 42, so as to provide walls 43 and 43a, with the wall 43 supporting the peripheral edge of a positioning hub 50 that is journaled within the bushing 22, while wall 43a supports a locking ring 44 whose peripheral edge is engaged against the counterbore 42, with ring 44 being held in place by bolts 45, 45 so as to retain the positioning hub 50 in the concentric seated position of FIGURE 2 at all times.

Turning now to FIGURES 2 and 3 of the drawings, it will be noted that the trimetric adjustment plate illustrated has four radial bores 51, 52, 53 and 54 provided therein between the opposed faces thereof, with elongate rods 55, 56, 57 and 58 being respectively received therein as clearly shown in FIGURE 3 of the drawings. Each of the rods just described is slidable longitudinally of the bore within which the same is received, and to this end a series of threaded plugs 59, 59 or radially adjustable screws control the position of each rod in its respective bore, with all rods being shown projecting in equal amounts into the cavity defined by counterbore 41 in FIGURE 3 of the drawings, with the ends of all rod members bearing against the flatted portions 50b, 50b that are provided on the peripheral wall 50a of the positioning hub 50 as shown in the drawings.

In addition to the aforementioned component parts, the trimetric adjustment plate 10 further has a plurality of tapped openings 60, 60 that extend between the opposed faces thereof as clearly shown in FIGURE 2 of the drawings, with these openings 60, 60 preferably being arranged in radially extending rows as shown in FIGURE 3 for the purpose of permitting maximum flexibility with respect to locating the supporting jacks that will now be described.

In this regard and referring to FIGURES 1 and 2, each jack element, generally designated by the numeral 70, includes a flat rectangular base portion 71 that is provided with a slot 72 that extends longitudinally inwardly from one end thereof. A boss 73 projects at right angles from the top surface of the base 71 near the end of slot 72 with boss 73 being tapped so as to threadingly receive a threaded supporting element 74. The element 74 preferably has a pointed end 74a for supporting the work piece, as well as adjustment nob 75 for facilitating easy axial adjustment.

It will be seen from FIGURE 1 of the drawings that the form of supporting jack just employed permits support of all sizes and shapes of work pieces with minimum difficulty.

In use or operation of the improved trimetric rotary table 10, it will first be assumed that the component parts have been assembled to the position shown in the drawings and further that a work piece W has been positioned on the supporting jacks as shown in FIGURE 1 with it being noted that the work piece W has a through opening H that must be aligned in concentricity with the axis of rotation of the rotary table assembly 11. This condition of concentricity is illustrated as being achieved in FIGURE 2 of the drawings where the axis of the hole H is shown in perfect concentricity with regard to the axis X, X of the rotary table assembly 11.

Figures 4, 5:
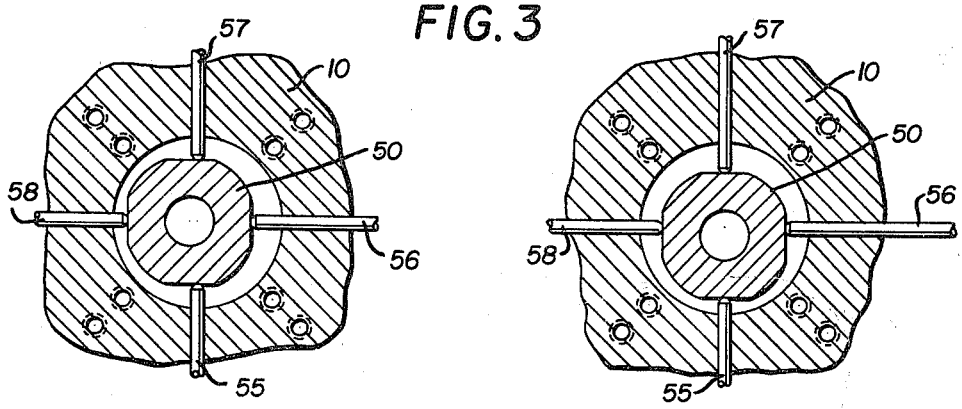
FIGURES 4 and 5 are fragmentary views similar to FIGURE 3 and showing the position of the component parts following adjustment as will be described in detail.

Assuming however, that it was necessary to require some adjustment, reference is being made to FIGURES 4 and 5 of the drawings where lateral adjustment of this type has been effectuated.

Specifically, and referring to FIGURE 4, the trimetric adjustment plate 10 has been moved slightly to the right by retracting rod 58 and extending the amount of projection of rod 56 by adjusting threaded slugs 59, 59 so as to achieve shifting of plate 10 to the right of plate 24 to the position shown in FIGURE 4.

In FIGURE 5, the plate 10 has been moved upwardly of plate 24, with this condition being achieved by retracting the rod 55 and extending the rod 57 with the opposed rods 56 and 58 being also extended slightly in projection as before so as to achieve proper bearing of all rod ends against the peripheral wall 50a of the positioning hub 50.

Assuming that concentricity has been achieved by adjusting the positioning rods 55, 56, 57 and 58 as previously described, it will now be assumed that the bolt 31 is tightened, and upon such tightening, the lip 33 will retain the achieved concentricity relationship between plates 10 and 24 when the plate 24 rotates around the fixed plate 20 with the result that the axis of the hole H of the work piece W, will remain concentric with the axis of rotation X, X of the rotary table assembly 11 during rotation of the work piece W.

Assuming the aforementioned condition to be achieved as discussed above, and further assuming that it is desired to establish a reference or starting plane for subsequent operations, it is merely necessary that the bolt 31 be backed off, whereupon the plate 10 may be rotated with the positioning hub 50 around the axis and relatively of plate 24, with it being noted that such relative rotation between the plate 10 and 24 will not destroy the concentric relationship that has been achieved therebetween because of the fact that the rod ends will be constantly bearing against the flats 50b to thus lock the components together and thus retain such concentricity.

In this regard, it is preferable that plate 10 be rotated relatively of plate 24 until the zero mark of indicia 26 is aligned in registry with the vernier 27 of the fixed component 20, whereupon the bolt 31 may be retightened to lock the plates 10 and 24 together for measured rotation in unison relatively of plate 20.

At this time, work piece W can be rotated as desired with all further measurements being taken with reference to the zero reference plane that was established when the indicia 26 and 27 were aligned in registry as above described, with all subsequent readings being direct and accurate readings of the angular rotation of the work piece with respect to the zero reference plane.

It will be seen from the foregoing how there has been provided a new and improved type of trimetric adjustment device that has particular utility with respect to improving the operation of conventional rotary tables, with the use of the improved adjustment plate reducing the set up time that is normally required and further insuring greater accuracy in the work performed.

While the aforementioned disclosure has shown that the adjustment plate has particular utility with respect to rotary tables, it is obvious that the novel concept thereof could be expanded further to other uses.

For example and in the event it was desired to effectuate milling operations, it is apparent that the number of clamps 32 could be increased as required and further that work would be clamped with respect to the support table 10 additionally.

While a full and complete description of the invention has been set forth in accordance with the dictates of the patent statutes, it is to be understood that the inventive concept herein disclosed is not limited to the specific embodiment shown.

Accordingly, modifications of the inventon may be resorted to without departing from the spirit hereof or the scope of the appended claims.

What is claimed is:

1. A rotary table having trimetric adjustment features of the character described, comprising:
   (1) a rotary table assembly including
      (a) a fixed component adapted to be received on a surface
      (b) a rotatable component rotatably carried by said fixed component and having an axis of rotation
   (2) a positioning hub concentrically disposed with respect to the axis of rotation of said rotatable component
   (3) a work supporting plate carried on said rotatable component with the contacting surfaces of said plate and said rotatable component being in coplanar relationship and having (a) an opening encircling at least a portion of said hub and
(b) a work supporting surface
(4) work supporting means adjustably projecting from said work supporting surface;
(5) and shifting means, for moving said work supporting plate in straight line radial directions relatively of said hub while retaining coplanar relationship between the contacting surfaces of said rotatable component and said work supporting plate.

2. The device of claim 1 further characterized by the fact that said shifting means include:
(1) opposed sets of elongate rods shiftably carried by said work supporting plate in radially disposed condition with the inboard ends thereof bearing against said hub; and
(2) opposed sets of radially adjustable screws bearing against the outboard ends of said elongate rods.

3. The device of claim 1 further characterized by the presence of clamping means carried by said rotatable component and releasably clamping said work supporting plate thereto whereby said rotatable component and said work supporting plate may rotate in unison relatively of said fixed component.

4. The device of claim 3 further characterized by the fact that:
(A) said rotatable component has a series of indicia thereon numbered from a zero starting point;
(B) said fixed component has a series of indicia thereon disposed for registry with said indicia of said rotatable component,
(1) whereby the degree of rotation of said rotatable component can be measured.

5. The device of claim 1 further characterized by the fact that said work supporting means carried by said work supporting plate are adjustable axially of said plate.

6. The device of claim 5 further characterized by the fact that said work supporting means include
(A) a base portion;
(B) means disposed on one end of said base portion for releasably attaching said work supporting means to said support plate; and
(C) a work supporting element
(1) disposed on the opposed end of said base and
(2) projecting at right angle therefrom and
(3) being axially adjustable.

7. The device of claim 5 further characterized by the fact that said work supporting plate has a plurality of radially aligned apertures thereon adapted to receive said work supporting means whereby said work supporting means may be disposed at a plurality of distances from the axis of said plate.

References Cited by the Examiner
UNITED STATES PATENTS

| | | | |
|---|---|---|---|
| 1,092,867 | 4/14 | Sellew | 269—85 |
| 1,259,126 | 3/18 | Parkes | 248—186 |
| 2,472,083 | 6/49 | Bartholdy | 77—63 X |
| 2,538,640 | 1/51 | Click | 269—78 X |

FRANK SUSKO, *Primary Examiner.*
ROBERT C. RIORDON, *Examiner.*